(12) United States Patent
Vermeulen et al.

(10) Patent No.: US 7,184,249 B2
(45) Date of Patent: Feb. 27, 2007

(54) ELECTRIC MOTOR CIRCUIT WITH OVERLOAD PROTECTION

(75) Inventors: Ludovicus Cornelis Paulus Vermeulen, Kamerik (NL); Bastiaan Huijzers, Dordrecht (NL); Eric Gerardus Paulus Van Slagmaat, Woerden (NL); Willem Niesing, Ede (NL)

(73) Assignee: Eaton Automotive B.V., Montfoort (NL)

( * ) Notice: Subject to any disclaimer, the term of this patent is extended or adjusted under 35 U.S.C. 154(b) by 0 days.

(21) Appl. No.: 10/526,712

(22) PCT Filed: Sep. 2, 2003

(86) PCT No.: PCT/NL03/00614

§ 371 (c)(1),
(2), (4) Date: Nov. 10, 2005

(87) PCT Pub. No.: WO2004/026634

PCT Pub. Date: Apr. 1, 2004

(65) Prior Publication Data

US 2006/0114625 A1 Jun. 1, 2006

(30) Foreign Application Priority Data

Sep. 3, 2002 (NL) .................... 1021382

(51) Int. Cl.
H02H 5/04 (2006.01)

(52) U.S. Cl. .................... 361/23; 361/1; 318/434; 318/437

(58) Field of Classification Search ............. 361/23, 361/1; 318/434, 437
See application file for complete search history.

(56) References Cited

U.S. PATENT DOCUMENTS

| 4,207,031 A | * | 6/1980 | Maskrey et al. ............. 417/12 |
| 4,405,887 A | * | 9/1983 | Tamura et al. ............. 318/443 |
| 4,407,388 A | * | 10/1983 | Steel ........................... 180/271 |
| 4,772,808 A | * | 9/1988 | Vial ............................ 307/125 |
| 6,130,514 A | * | 10/2000 | Oesterholt et al. .......... 318/438 |
| 6,600,640 B1 | * | 7/2003 | Buscher et al. ............ 361/93.1 |

\* cited by examiner

*Primary Examiner*—Rita Leykin
(74) *Attorney, Agent, or Firm*—Dykema Gossett PLLC

(57) ABSTRACT

An electric motor circuit utilized, for instance, for adjusting a wing mirror of a vehicle is provided with a motor with a driving circuit. The driving circuit includes a relay switch element included in series with the motor and a protecting circuit for bringing the relay switch element into a non-conductive position at overload of the motor. The protective circuit is provided with an exciting coil and a deenergizing coil. The exciting coil serves for bringing the relay switch element into a conductive position. The exciting coil is included parallel to the motor in series with the relay switch element. The deenergizing coil is included in series with the motor for bringing the relay switch element in a non-conductive position when a current through the deenergizing coil and the motor exceeds a threshold value. Motor and motor protection are preferably included together in the housing of a mirror construction.

7 Claims, 1 Drawing Sheet

ELECTRIC MOTOR CIRCUIT WITH OVERLOAD PROTECTION

RELATED APPLICATIONS

This application is a 35 U.S.C. 371 national phase application of PCT/NL2003/000614 (WO 2004/026634), filed on Sep. 2, 2003, entitled "Electric Motor Circuit with Overload Protection", which claims priority to Netherlands Application No. 1021382, filed Sep. 3, 2002, each of which is incorporated herein by reference in its entirety.

The invention relates to an electric motor circuit with overload protection, more in particular for a mirror construction provided with such an electric motor circuit, for use as wing mirror in a vehicle.

An electric motor can become overloaded when its movement is arrested. For example, an electric motor can be used in a motor-foldable wing mirror for a vehicle, as known, for instance, from the Dutch patent application having number 1017466, in which an example of a mechanical design of such a mirror can be found. With a motor-foldable mirror, through operation of a switch in the vehicle, the mirror can, for instance, be brought into an operative position or into a folded-in position in which the mirror is less susceptible to accidents causing damage. An operating circuit enables a motor to be activated in reaction to the switch, preferably by applying a voltage across the motor with a polarity dependent on the desired direction of rotation of the motor.

As wing mirrors sit in exposed positions, there is a considerable risk that the wing mirror during adjustment is restrained for some reason or other. As a result, the risk arises that the motor used for the adjustment sustains damage. Protective measures are required to prevent such damage.

In practice, a number of solutions for protecting an electric motor are known. For instance, the use of a PTC in the operating circuit is known (a PTC is a resistor having a Positive Temperature Coefficient, i.e. an increasing resistance value with increasing temperature). The PTC is included in series with the motor, so that the temperature of the PTC increases when too high a current flows through the motor. That is why the resistance of the PTC also increases. With too high a resistance, the current through the motor is switched off. Such a protective technique has the drawback that the temperature of the PTC decreases only gradually after the overload has gone. As a result, the motor cannot be directly switched on again when the cause of the overload has gone. Further, such a protective technique makes the wing mirror more complex and susceptible to supply voltage fluctuations. As a result, a margin of safety against such fluctuations has to be maintained which, in turn, increases the electricity consumption of the mirror.

Generally, wing mirrors are exposed to great temperature extremes. On frosty days, the temperature can drop far below zero degrees Celsius while the temperature of the wing mirror in the sun can easily exceed fifty degrees Celsius. This also imposes high demands on the protective circuit which raise the costs of wing mirrors further.

One object of the invention is to provide for an electric motor circuit which protects the motor from overload and with which, directly upon disappearance of the cause of the overload, the motor can be switched on again.

Another object of the invention is to provide for an electric motor circuit wherein, in a simple manner, the protection is made insensitive to temperature fluctuations.

It is a further object of the invention to provide for an electric motor circuit with a protection which is effective over a broad temperature range and/or at supply voltages with different polarity.

The invention provides for an electric motor circuit according to claim 1. It is provided with a relay switch element (for instance a coil-operated switch) in series with the motor. Under normal conditions, the relay switch element is maintained in a conducting position with an exciting coil which is connected in parallel with the motor. When the current through the motor rises because its motion is blocked, a deenergizing coil, included in series with the motor, switches the relay switch element to a non-conducting position. Thus, a circuit is provided which works with supply voltages of different polarities, and which is robust and little susceptible to temperature fluctuations. Moreover, the circuit is insensitive to supply voltage variations because the deenergizing coil and the exciting coil are operated by the same supply.

Preferably, a winding of the motor and a winding of the deenergizing coil are wound from material (preferably the same material) having substantially the same resistance temperature dependency, and the windings of the motor and the deenergizing coil are mounted in heat-conducting contact with each other. Thus, the protection is even less susceptible to temperature fluctuations. Preferably, at least the deenergizing coil and the motor are included in the same housing to minimize the temperature dependency. Preferably, also the exciting coil is wound of such material and included in the housing to even further minimize the temperature dependency.

Preferably, the relay switch element comprises a single switch whose position is influenced both by the exciting coil and the deenergizing coil. This reduces the costs of the circuit.

The exciting coil and the deenergizing coil are preferably included in the circuit whilst wound around a common core, for influencing the relay switch element. This reduces the costs of the circuit.

In particular, preferably, a mirror construction for a vehicle is provided with such a circuit. The deenergizing coil is preferably included together with the motor in the housing of the mirror construction, to guarantee the same temperature behavior.

These and other objectives and advantageous aspects of the circuit and Furor construction according to the invention will be described farther with reference to the following Figures.

Figure 1:
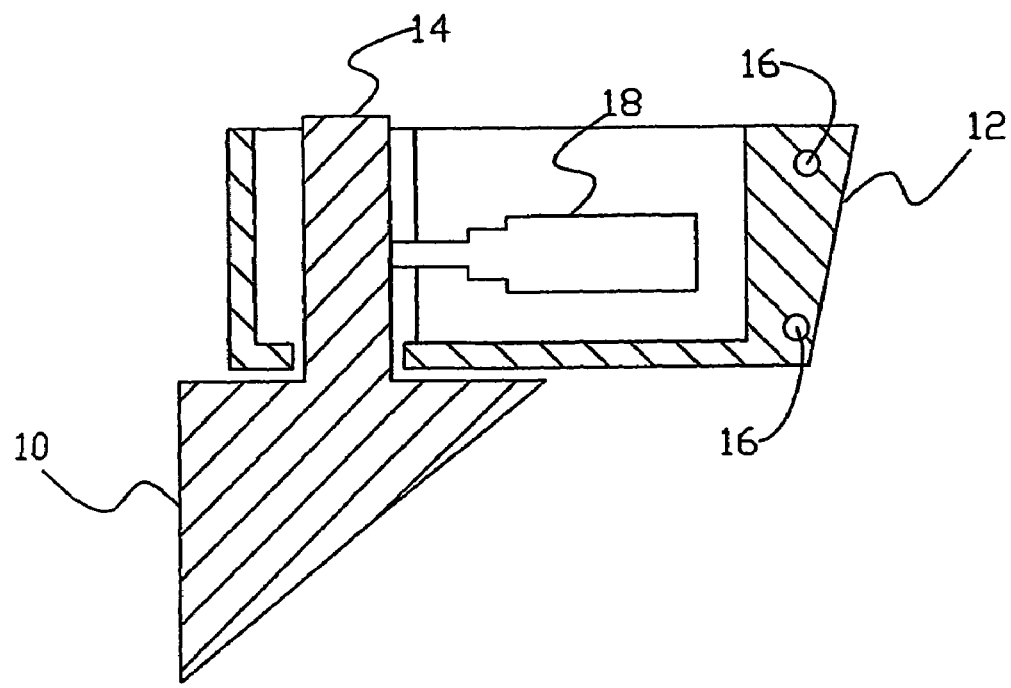
FIG. 1 shows a wing mirror for a motor vehicle.

FIG. 1 shows a mount for a wing mirror for a motor vehicle in cross section. The mount is provided with a fixed part 10 for mounting to a vehicle (not shown) and a pivotable part 12 which is fitted so as to be pivotable about a shaft 14 relative to fixed part 10. Pivotable part 12 contains mounting holes 16 to which a wing mirror (not shown) for the vehicle is fitted. In the mount, a motor 18 is included which is coupled to a shaft 14 for pivoting the pivotable part relative to the fixed part 10 (for instance with a transverse coupling using a worm wheel (not shown) on the shaft of the motor and a toothed wheel (not shown) on the rotary shaft 14. Pivotable part 12 also forms the housing of motor 18.

Motor 18 serves, for example, for adjusting the mirror angle. Motor 18 is switched on when adjusting the position of pivotable part 12 and hence of the mirror (not shown)

relative to fixed part 10. When pivotable part 12 reaches its end position, the motor is to be automatically switched off to prevent overload.

The construction of such a wing mirror mount and the manner of incorporating therein one or more actuator mechanisms is sufficiently known to the skilled person and will therefore not be further elucidated here. Although only an actuator mechanism for pivotal movement about a substantially vertical axis is shown, it is evident that also other actuator mechanisms for rotations about other axes can be provided. It will also be clear that motor 18 can equally be included in fixed part 10, with fixed part 10 then forming the housing of motor 18.

Figure 2:
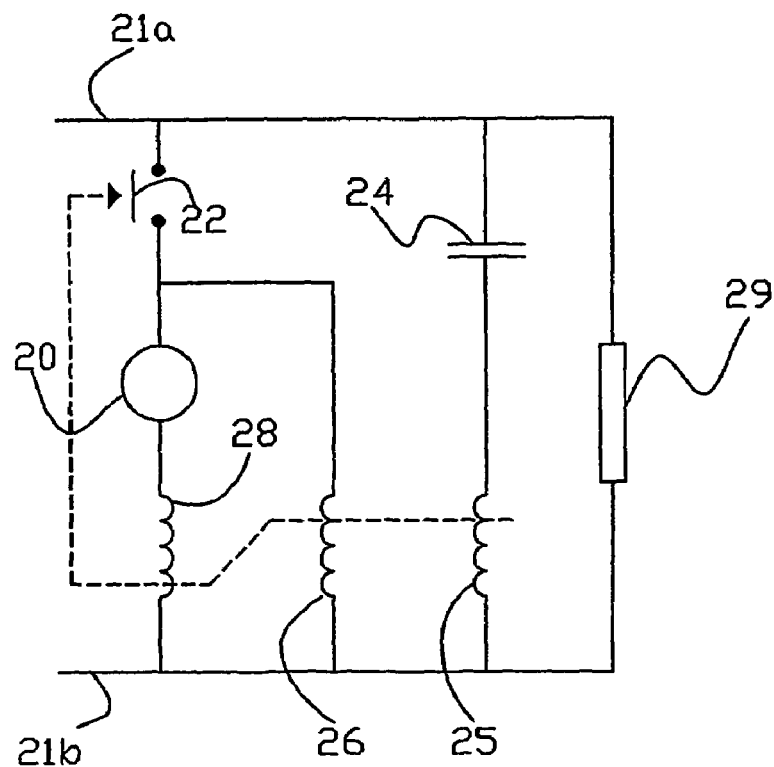
FIG. 2 shows a circuit for controlling the motor of the mirror adjusting mechanism.

FIG. 2 shows a circuit for controlling a motor 20, for instance for use in a mirror adjusting mechanism. The circuit has feed connections 21*a*,*b* and includes a relay switch 22, a capacitor 24, a resistor 29, a switch-on coil 25, an exciting coil 26 and a deenergizing coil 28. The relay switch 22 is included in series with motor 20 between feed connections 21*a*,*b*. Switch-on coil 25 and exciting coil 26 are coupled to relay switch 22 for, at a given polarity of the feed voltage, both applying a force rendering the relay switch 22 conductive. Deenergizing coil 28 is also coupled to relay switch 22, but with a polarization acting counter to the switch-on coil 25 and exciting coil 26, for applying a force rendering the relay switch 22 non-conductive.

Deenergizing coil 28 is included in series with relay switch 22 and motor 20 between feed connections 21*a*,*b*. Capacitor 24 and switch-on coil 25 are included in series with each other and in parallel with the series connection of deenergizing coil 28, relay switch 22 and motor 20 between feed connections 21*a*,*b*. Resistor 29 is included in parallel with the series connection of capacitor 24 and switch-on coil 25. Exciting coil 26 is included in series with relay switch 22, but in parallel with motor 20 between feed connections 21*a*,*b*.

In operation, motor 20 is switched on by providing a step in the supply voltage between feed connections 21*a*,*b*, for instance from zero volt to a negative or a positive value. Through the step, temporarily, a current is formed through switch-on coil 25 generating a force which brings the relay switch 22 in a conductive position. The duration of this current is limited by the presence of capacitor 24 and resistor 29.

When relay switch 22 enters the conductive state, a current starts to flow through motor 20 and through exciting coil 26. The current through the exciting coil 26 leads to a force on relay switch 22 maintaining this relay switch 22 in the conductive position. Consequently, current continues to flow through motor 20 and exciting coil 26, so that motor 20 adjusts the position of the mirror mechanism.

Deenergizing coil 28 serves for deenergizing relay switch 22 when the mirror mechanism reaches its end position. The current through motor 20 also flows through deenergizing coil 28, which, as a result, generates a force on relay switch 22. This force is contrary to the force generated by exciting coil 26. Deenergizing coil 28 and exciting coil 26 are dimensioned such that under normal conditions (when motor 20 runs normally) this opposite force is insufficient for bringing the relay switch 22 in the nonconductive position.

However, when the motor, for some reason or other, no longer runs (for instance because the mirror mechanism has reached its end position, or because the mechanism is restrained in another manner), the current through motor 20 and deenergizing coil 28 increases. As a result, also the counter-force generated by deenergizing coil 28 increases, resulting in the relay switch 22 being switched into the non-conductive position. As a result, the current through motor 20 fails. Thus, motor 20 is protected from overloading.

It will be clear that the circuit works independently of the polarity of the voltage across feed connections 21*a*,*b*. By utilizing both possible polarities, motor 20 can be made to rotate in two mutually opposite directions.

The circuit of switch-on coil 25, capacitor 24 and resistor 29, which serves for initially switching on the relay switch 22, is not essential to this protection. Instead of this circuit, other constructions can be used, such as a switch which temporarily bridges relay switch 22, as long as these constructions do not permanently supply current to motor 20.

Also, relay switch 22 could be replaced by a series connection of relay switches (not shown) which, through an exciting coil 26 and deenergizing coil 28, respectively, can be switched into a conductive and non-conductive position. However, the use of a single switch which is operated by both exciting coil 26 and deenergizing coil 28 reduces the costs of the switch, the more so because switch-on coil 25 too operates the same relay switch 22.

Preferably, exciting coil 26 and deenergizing coil 28 are wound around a common magnetic core (not shown), with which the magnetic field used for switching the relay switch 22 is generated. The invention thus provides for a relay with a relay switch 22 and two or three arrays of windings through which, separately from each other, current can be sent. Preferably, of each array of windings, one extremity is coupled to a common connection of the relay, in such a manner that currents flowing in the same direction through deenergizing coil 28 and exciting coil 26 to this connection, exert a mutually oppositely directed force on the switch.

Preferably, switch-on coil 25 too is wound around this core. If switch-on coil 25 is present, it preferably also has an end which is coupled to the connection, such that currents flowing in the same direction through switch-on coil 25 and exciting coil 26 to this connection exert forces in the same direction on the switch.

Further, preferably, at least deenergizing coil 28 is in heat contact with motor 20, and motor 20 and deenergizing coil 28 contain windings of material having substantially the same resistance temperature dependency. Thus, the protective action of the circuit is screened from temperature sensitivity. Thus, increase of the resistance of the motor does not lead to insufficient current through the deenergizing coil 28, as a result of which the protection would not work. Thus, the deenergizing coil 28 can be designed with a limited margin of safety so that it is possible to minimize losses due to the presence of deenergizing coil 28.

Preferably, at least deenergising coil 28 and motor 20 are jointly included in one and the same housing, for instance of the mirror construction. Thus, both are exposed to the same temperature influences for screening the protective action of the circuit from temperature sensitivity. Optionally, motor 20 and deenergizing coil 28 could also be included in pivotable part 12 and fixed part 10 of the mirror construction, respectively, or the other way around, so that fixed part 10 and pivotable part 12 together form the housing. In that case too, both are exposed to the same temperature influences outside of the vehicle. Accommodation in one and the same space of the same part (fixed part 10 or pivotable part 12) has the additional advantage that temperature influences coincide even more.

Also the windings of exciting coil 26 are preferably of the same material as the windings of motor 20. This also makes it possible to construct the exciting coil 26 in a manner such that losses due to exciting coil 26 are minimized.

The invention claimed is:

1. An electric motor circuit comprising:
   a motor;
   a driving circuit for the motor, the driving circuit including a relay switch element in series with the motor and a protecting circuit coupled to the relay switch for bringing the relay switch element into a non-conductive position at an overload of the motor, the protecting circuit comprising:
   an exciting coil for bringing the relay switch element in a conductive position, which exciting coil is in parallel with the motor and in series with the relay switch element; and
   a deenergizing coil in series with the motor for bringing the relay switch element into a non-conductive position when a current through the deenergizing coil and the motor exceeds a threshold value.

2. An electric motor circuit according to claim 1, further comprising a winding of the motor and a winding of the deenergizing coil comprising a material having substantially the same resistance temperature dependency, the windings of the motor and the deenergizing coil being mounted in heat-conductive relation with each other.

3. An electric motor circuit according to claim 1, wherein the relay switch element contains a single switch whose position is influenced both by the exciting coil and the deenergizing coil.

4. An electric motor circuit according to claim 1, further comprising a switch-on coil in a circuit which is arranged for having a temporary current flow through the switch-on coil when voltage is applied across the series connection of the motor and the relay switch element, which switch-on coil is coupled to the relay switch element for bringing the relay switch element into a conductive position with the temporary current.

5. A mirror construction comprising:
   a support for mounting the mirror construction;
   a carrier for a mirror;
   a motor coupled to the support and the carrier for pivoting the carrier relative to the support; and
   a driving circuit for the motor, the driving circuit including a relay switch element in series with the motor and a protecting circuit coupled to the relay switch for bringing the relay switch element into a non-conductive position at an overload of the motor, the protecting circuit comprising:
   an exciting coil for bringing the relay switch element in a conductive position, which exciting coil is in parallel with the motor and in series with the relay switch element; and
   a deenergizing coil in series with the motor for bringing the relay switch element into a non-conductive position when a current through the deenergizing coil and the motor exceeds a threshold value.

6. The mirror construction according to claim 5, further comprising a housing in which the motor and the deenergizing coil are included.

7. The mirror construction according to claim 6, further comprising the exciting coil included in the housing.

\* \* \* \* \*